Oct. 9, 1923.

J. M. STONER 1,470,036

SHOCK ABSORBER FOR VEHICLES

Filed Dec. 24, 1921

Inventor:
Jack M. Stoner
By Jones Bain & Hinkle
Attys.

Patented Oct. 9, 1923.

1,470,036

UNITED STATES PATENT OFFICE.

JACK MINER STONER, OF CHICAGO, ILLINOIS, ASSIGNOR OF ONE-HALF TO THOMAS K. STONER, OF CHICAGO, ILLINOIS.

SHOCK ABSORBER FOR VEHICLES.

Application filed December 24, 1921. Serial No. 524,736.

*To all whom it may concern:*

Be it known that I, JACK MINER STONER, a citizen of the United States, residing at Chicago, in the county of Cook and State of Illinois, have invented certain new and useful Improvements in Shock Absorbers for Vehicles, of which the following is a specification.

This invention relates to improvements in shock absorbers for vehicles.

One of the objects of the invention is to provide a shock absorber which will interpose resistance to the rebound of the sprung and unsprung spring-connected members in either direction substantially proportional to the amplitude of movement of said spring connected members, and which will permit substantially free, unopposed movement of the springs within normal working limits.

Another object is to provide an inexpensive, incomplex and efficient structure for the purpose described.

Another object is generally to improve shock absorbers.

Other objects and advantages of the invention will readily appear from a consideration of the following description when taken in conjunction with the drawings, wherein:—

In all the views the same reference characters are employed to indicate similar parts.

Figure 1:
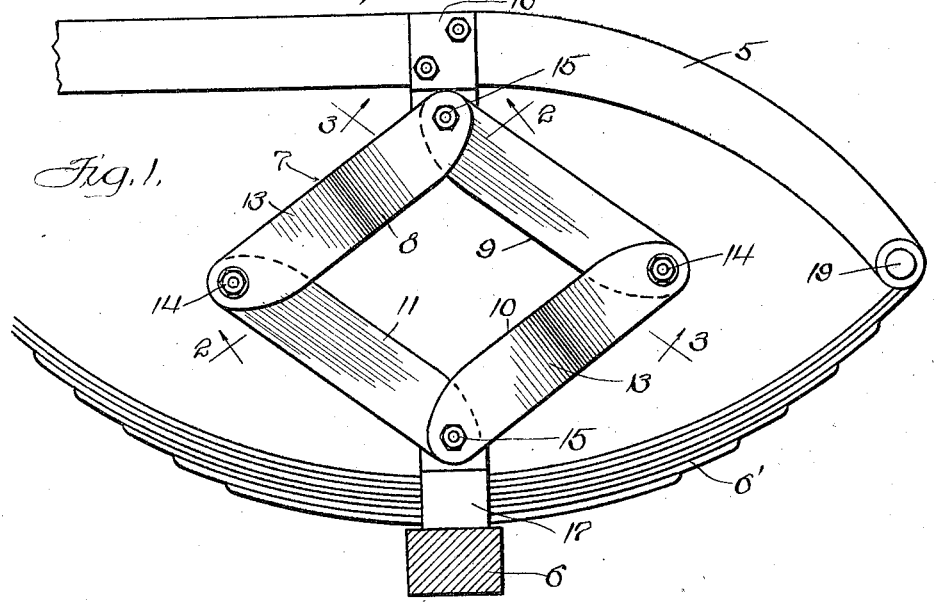
Fig. 1 is a side elevation of the shock absorber connected between two spring-connected vehicle members.

In the shock absorber about to be described there is a sufficient and suitable resistance interposed by the device at the instant when the recoil or rebound occurs. In the operation of springs, as they are usually applied to vehicles, the free and forced vibration causes excessive spring action and thus a soft spring will hit bottom and then violently recoil. The free vibration is the effect which occurs when a relatively soft spring is about to expand suddenly after compression and forced vibration is that which is caused by impressed force compressing the spring. If free and forced vibrations are properly controlled the objectionable results following the recoil or rebound are effectively taken care of. A shock absorber that will permit a relatively soft spring to move uninterruptedly within a reasonable limit of its maximum movement and interposes a resistance proportional to the movement excessive of its normal movement, in either direction, will produce easy smooth running of the car.

In the drawings which I have used for illustrating my invention, 5 is a part of the frame of an automobile and 6 is the axle of the running gear or chassis. Between the members 5 and 6 the shock absorber 7 is shown to be connected.

Figure 2:
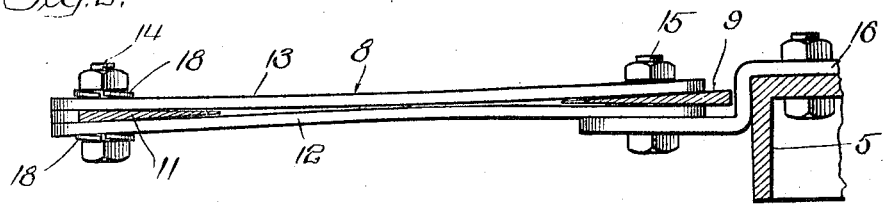
Fig. 2 is a section taken on line 2—2 of Fig. 1.
Figure 3:
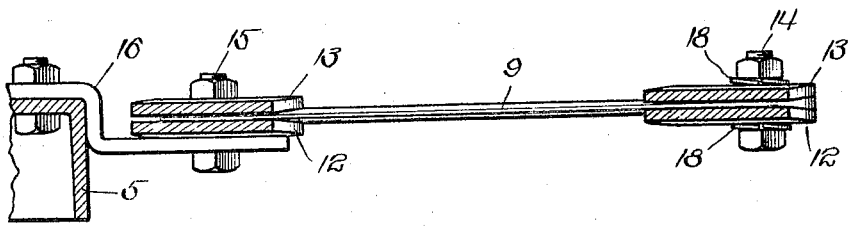
Fig. 3 is a section on line 3—3 of Fig. 1.

The shock absorber 7 is normally rectangular in shape, as shown in Fig. 1, and consists of four link members 8, 9, 10 and 11. The link members 8 and 10 are double, each consisting of the blades 12 and 13 that are curved or bent inwardly towards each other, as more clearly shown in Fig. 2. At and between the ends of the members 12 and 13 the members 9 and 11 are respectively included. The members 9 and 11 are transversely tapered or made wedge-shape, corresponding to the inclination of the blades 12 and 13 of the members 8 and 10. The members 12 and 13 are connected at their ends to the members 11 and 9, respectively, by the bolts 14 and 15, and the bolts 15 are connected to clips 16 and 17, respectively, that are secured to the sprung and unsprung members of the vehicle; the frame 5 being the sprung member and the axle of the running gear 6 the unsprung member.

When the axle 6 approaches more nearly to the frame 5 than shown in Fig. 1, wedge-shape members 9 and 11 enter the space between the members 12 and 13 and tend to pry them apart, and this resistance producing effect is increased proportional to the approach of the frame members 5 and 6. The same effect takes place when there is an increase of distance between the members 5 and 6, but at different ends of the members. The compression of the spring forces the shock absorber members together near the bolts 14, while the extension of distance between the spring connected parts of the vehicle forces the shock absorber members together near the bolts 15, the action in both cases being substantially the same; that is to say, the resilient resistance thus opposed by the shock absorber is proportional to the displacement of its members; or more correctly stated, is proportional to the rebound or compression of the spring due to the major inequalities of the roadway over which the vehicle is passing.

To add to the resilient effect of the link members or blades 12 and 13, spring rings 18 may be placed between the head and nut of the bolts 14 or 15. The members of the shock absorber are preferably made of the best quality of spring steel so that the plates are capable of considerable latitude of movement or displacement when forced out of their normal positions by the links 9 and 11. In the event that greater elasticity or resiliency is required, spring rings 18 may be included between the head and the nut of the bolts by which the members are pivoted, and if it is desired that the resistance of the springs when moving in one direction be interposed by the shock absorber to a greater extent than the resistance interposed when the spring is moved in the opposite direction, the spring rings 18 may be placed upon appropriate bolts for producing this varying effect.

In the drawing the spring 6' is shown pivotally connected to the axle by any suitable means, and at one end as at 19 it is similarly connected to the frame member 5. The rear end of the springs 6' may be connected to shackles of the usual form.

While I have herein shown a single embodiment of my invention for the purpose of clear disclosure, it will be manifest to persons skilled in the art, that many changes may be made in the general arrangement and configuration of the parts, within the scope of the appended claims.

Having described my invention what I claim as new and desire to secure by Letters Patent, is:—

1. A shock absorber comprising two pairs of like members, one member of a pair of like members comprising two overlying flat spring plates, curved inwardly toward each other; each of the other members comprising a wedge-shape plate, the latter members having their ends pivoted to the respective ends of the other members and between the plates thereof, thereby forming a parallelogram whereby resistance to movement of two members toward and from the other two members, in both directions, is imparted.

2. A shock absorber comprising two pairs of like members, one member of a pair of like members comprising two overlying flat spring plates curved inwardly toward each other; each of the other members comprising a wedge-shape plate, the latter members having their ends pivoted to the respective ends of the other members and between the plates thereof, thereby forming a parallelogram whereby resistance to movement of two members toward and from the other two members, in both directions, is imparted, the arrangement being such that slight initial movement is permitted without interposing resistance due to the formation of the plates.

In testimony whereof I hereunto subscribed my name.

JACK MINER STONER.